United States Patent [19]

Zeoli

[11] Patent Number: 5,018,386

[45] Date of Patent: May 28, 1991

[54] METHOD FOR TESTING PRESSURIZED WATER SYSTEMS

[76] Inventor: Paul Zeoli, 6245 Gentry Ave., North Hollywood, Calif. 91606

[21] Appl. No.: 500,732

[22] Filed: Mar. 27, 1990

Related U.S. Application Data

[63] Continuation of Ser. No. 266,283, Oct. 26, 1988, abandoned, which is a continuation of Ser. No. 926,007, Oct. 31, 1986, abandoned.

[51] Int. Cl.$^5$ .............................................. G01M 19/00

[52] U.S. Cl. ........................................ 73/168; 137/559

[58] Field of Search .................. 73/168, 37, 37.8, 4 R, 73/DIG. 8; 137/559, 557, 356, 357

[56] References Cited

U.S. PATENT DOCUMENTS

| | | | |
|---|---|---|---|
| 2,924,971 | 2/1960 | Schroeder et al. | 73/168 |
| 3,854,497 | 12/1974 | Rosenberg | 137/559 |
| 4,387,591 | 6/1983 | Corzine et al. | 73/168 |
| 4,598,579 | 7/1986 | Cummings et al. | 73/37 |
| 4,599,890 | 7/1986 | Girone et al. | 73/37 |
| 4,643,224 | 2/1987 | Rung et al. | 137/559 |
| 4,655,078 | 4/1987 | Johnson | 73/168 |

*Primary Examiner*—Thomas B. Will

*Attorney, Agent, or Firm*—Poms, Smith, Lande & Rose

[57] ABSTRACT

Method for testing a pressurized water system to determine the water pressure at a predetermined location in the system. A water pressure testing meter is fluidly coupled to the normally closed outlet of a pressure reducing valve coupled to a water reservoir. A water flow meter is fluidly coupled to the testing meter and the flow meter is fluidly coupled to a shut-off valve coupled to a water reservoir. The static pressure of the first mentioned reservoir is determined and the reducing valve and flow is fully opened to determine the water pressure at the testing meter. The water flow through the shut-out valve is adjusted so that the pressure on the testing meter reads between a predetermined desired range. In this manner, the operator can quickly and easily determine if the reducing valve was set properly for the desired water pressure at the location and, if not, the system can be shut down, the reducing valve can be readjusted and the system retested to arrive at the proper desired pressure.

8 Claims, 1 Drawing Sheet

10
11
13
13'
14
15
16
17
18
19
20
21
22
23
24
25
26
27
28
29
30
105
B
1 2 3 4 5 6 7 8 9 10 11 12 13 14

METHOD FOR TESTING PRESSURIZED WATER SYSTEMS

RELATIONSHIP TO OTHER APPLICATIONS

This application is a continuation of application Ser. No. 07/266,283, filed Oct. 26, 1988, which was a continuation of application Ser. No. 06/926,007, filed Oct. 31, 1986, both now abandoned.

BACKGROUND OF THE INVENTION

The invention relates to pressurized water systems; and, more particularly, to a method for testing the water pressure at a predetermined location in a system.

DESCRIPTION OF THE PRIOR ART

When buildings are erected, a standpipe system is installed in the building. Each floor of the building has a valve which, in a fire, can be quickly and easily connected to a fire hose to provide water under pressure for fighting the fire.

Since these valves must work properly when necessary, they must be tested periodically to insure that proper water pressure and volume is available at the particular pressure reducing valve outlet in the standpipe system of the building. If the pressure is too low, there might not be sufficient water pressure to fight a fire efficiently. If the pressure is too great, it might rupture the hose. Part of the problem is that known prior art pressure valves used in such systems are automatic valves controlled by an inner valve connected to a semi-balanced piston. The inner valve is held in the extreme "open" position by a preloaded spring, and is positioned in the downstream portion of the valve, closing the valve when the desired pressure has been reached.

Effectiveness of the piston and the amount of preloading must be related to allow the piston to move the inner valve to the extreme opposite travel "closed" position, immediately after the pressure in the system reaches the desired operating pressure This preloading of the spring is done at the factory, based upon the standpipe pressure at the individual floor and location of the valve. The springs of these valves can also be adjusted after installation out in the field.

Fire department regulations, for obvious reasons, require that these valves be tested periodically. These valves accumulate debris in use and the internal springs must be exercised periodically to keep them working properly. The usual procedure is to connect a fire hose selectively to each valve on each floor of a building, running the hose to the bottom floor of the building. Much water is wasted in such testing procedures and considerable man-hours are necessary to go through a building floor by floor and test each valve. For example, a 14 story building valve in the building for a total time for each valve of about 1 to 1½ hours for testing and clean up. After testing, the hoses must be dried out or they will rot. Thus, a 14 story building might require 9 man hours of work for each valve on each floor and for each stairwell.

There is thus a need for a valve testing system which can test the pressure reducing valves of the building using less water and, in most cases, reclaim the water used. There is a need for such a testing system which can be carried out using considerably less man-hours, such as ½ to 1 man-hour per valve yet still meet fire inspection requirements. Such testing system should be safe, cost efficient and be able to be carried out quickly and easily.

SUMMARY OF THE INVENTION

It is an object of this invention to provide a method for testing the pressure reducing valves in a pressurized water system.

It is a further object of the invention to carry out the foregoing object reclaiming the water used in such testing.

These and other objects are preferably accomplished by providing apparatus including a water pressure testing meter fluidly coupled to the normally closed outlet of a pressure reducing valve coupled to a water reservoir. A water flow meter is fluidly coupled to the testing meter and the flow meter is fluidly coupled to a shut off valve coupled to a water reservoir. The static pressure of the first mentioned reservoir is determined and the reducing valve is fully opened to determine the water pressure at the testing meter. The water flow through the pressure reducing valve is adjusted so that the pressure on the testing meter reads within a predetermined desired range. In this manner, an operator can quickly and easily determine if the reducing valve was set properly for the desired water pressure at the location and, if not, the system can be shut down, the reducing valve can be readjusted, and the system retested to arrive at the proper desired pressure.

DESCRIPTION OF THE PREFERRED EMBODIMENT

Figures 1, 2, 3:
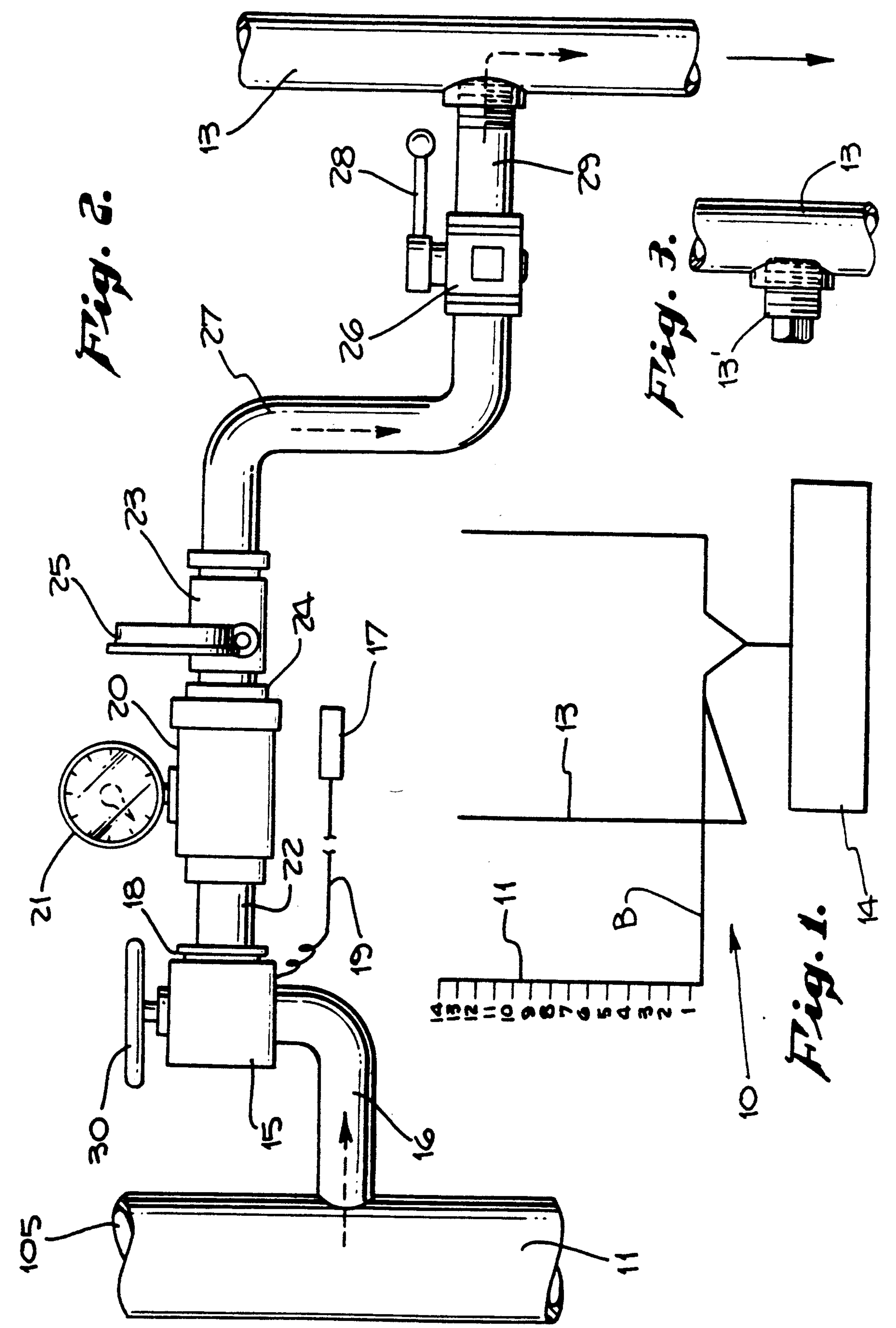
FIG. 1 is a schematic illustration of a conventional 14 story building having a well in the sub-structure thereof.
FIG. 2 is schematic illustration of a conventional pressure reducing valve fluidly coupled to the standpipe of the building of FIG. 1, with the apparatus of the invention fluidly coupled thereto.
FIG. 3 is a detailed view of a portion of the apparatus of FIG. 2 showing a plug normally closing off the downpipe 13.

Referring now to FIG. 1 of the drawing, a building 10 is represented schematically having a standpipe 11 extending from the basement (represented by letter B) of building 10 to the 14th floor (represented by numbers 1 to 14 along side of standpipe 11). A downpipe 13 extends from the 14th floor down below basement B and discharges into a well 14. It is to be understood that standpipe 11 is fluidly coupled to an external source of water, such as a city water system, and building 10 may obviously have any desired number of floors. Also, some buildings may not have a storage well, as well 14, and the invention to be discussed herein can apply to such buildings. The well 14 may be of any suitable capacity, such as one having a volumetric capacity of about 25,000 gallons.

As seen in FIG. 2, a conventional pressure reducing valve 15 is shown coupled via conduit 16 to the standpipe of building 10 (see FIG. 1). Such valves are well known in the art. For example, the type of reducing valves manufactured and sold by Wilkins Regulator of Paso Robles, California under the name Z-3000 ZURN Pressure-Tru Angle Fire Valves are used in many buildings. These valve are rated for 400 PSI. The valve may be a 2½" valve for direct connection to high pressure fire protection standpipe and are installed for 2½" fire hose connections.

The valve is bronze construction with a 2½" female inlet and 2½" male outlet for a specified hose thread.

The pressure regulator of these valves is set by the manufacturer and certified to the specifications required at each fire hose station for each floor elevation. The valve is adjustable and may be reset in the field.

As seen in FIG. 2, the valve 15 has a removable end cap 17 which may be internally threaded for connection to outlet 18, coupled to valve 15 by the chain 19. Of course, valve 15 is normally closed off by cap 17 but in carrying out my invention, cap 17 is unthreaded from valve 15.

A conventional water pressure measuring device 20, such as a piezometer, having a gauge 21 associated therewith is fluidly coupled to outlet 18, after removal of cap 17, via conduit 22. For example, a 2½" piezometer as manufactured by Halprin Supply Co., Los Angeles, Calif. under the model designation No. PG6 may be used. These piezometers are used for determining pressures in nozzles, and static or water flow pressures in hydrant or hose lines. Preferably, such meters should have a range of at least from 0 to 300 psi and, preferably flows at not less than about 300 gallons per minute for about 5 minutes.

A conventional water flow meter 23 is fluidly coupled to piezometer 20 via coupling 24. For example, the flow meters manufactured and sold by Halprin under the model designation No. M025 (for a 2½" meter) may be used. Such meters include a transparent manometer 25 with a ball bearing rocket-lug 2½" swivel inlet and a direct reading manometer which shows immediately and accurately water flow in gallons per minute, when attached to any standard fire hydrant, hose or pumper. The manometer 25 suggested has a 200 to 1500 GPM range. Such flow meter should have a range of about 200 to 1500 gpm.

A conventional ball shut-off valve 26 is fluidly coupled to the flow meter 23 via conduit 27, such as a fire hose. Conduit 27 may be 10 to 20 feet or so in length. Any suitable valve may be used, such as a ball, screw gate or keystone valve. For example, the 2½" ball valves manufactured and sold by Halprin under the name HYDRO-LOC ELKHART model No. V896-Q-K-F may be used. Such valves may have a self-locking handle 28 and allow gating in any position. Any suitable shut off valve, such as a ball or butterfly valve, may be used.

Valve 26 is coupled, via conduit 29, to the main down flow conduit or downpipe 13 heretofore discussed with respect to FIG. 1. Downpipe 13 extends between the uppermost floor, such as floor no. 14 in FIG. 1, and the well 14 in the basement B or other substructure of the building 10. Downpipe 13 is normally closed off by a threaded cap 13' (FIG. 3) where conduit 29 engages downpipe 13. Thus, parts 22, 21, 20, 24, 25, 23, 27, 26, 28 and 29 may be coupled between preexisting valve 15 and downpipe 13 for carrying out the method of my invention.

Although a preferred dimension of 2½" piping and connections has been indicated, obviously any suitable dimensions may be used. Also, other meters and valves may be used. However, in the example of the invention herein disclosed, if standpipe 11 is a conventional 8" diameter sprinkler main pipe, the downpipe 13 may be a 4" diameter cast iron main pipe and the various meters and valves suggested would have the ability to function properly, in the testing system and method of the invention. Of course, if the diameter of the preexisting standpipe of the building differed from that of standpipe 11, obviously variations could be made by the artisan to arrive at a suitable diameter downpipe and valves, meters and conduits connected therebetween.

In carrying out a test of the pressure of flow of water through valve 15, cap 17 is removed and parts 22, 21, 20, 24, 25, 23, 27, 26, 28 and 29 are coupled between valve 15 and downpipe 13 (after removing the aforementioned plug). At this time of course, valve 15 is normally closed. Valve 15 is now opened flowing fluid through outlet 22 and conduit 27 to shut-off valve 26. Valve 26 is now closed via handle 28 to stop water flow through downpipe 13. a static pressure reading at gauge 21 associated with water pressure measuring device 20. This is the first part of the test of valve 15. If the reading at gauge 21 is below a predetermined desired static pressure, e.g., the desired range being between about 80 and 120 psi, then valve 15 is adjusted to increase the static pressure at reducing valve 15, as measured at gauge 21, until it is increased to a predetermined static pressure (e.g., above 80 psi). This is the second part of the test.

Shut-off valve 26 is now opened via handle 28 thereby flowing water to conduit 29 and through downpipe 13 while the operator visually observes both the residual gallon per minute reading (at manometer 25 that is associated with water flow meter 23) flowing from outlet 22 to conduit 27 and the residual pressure reading (at gauge 21, associated with water pressure measuring device 20) for a predetermined flow rate and period of time, such as 330 gallons per minute for five minutes. This is the third part of the test. If the residual pressure reading at gauge 21 does not drop below the predetermined minimum level, e.g., 80 psi, the test is complete Valve 15 is now shut off and parts 22, 21, 20, 24, 25, 23, 27, 26, 28 and 29 are disconnected from valve 15 (which is capped via cap 17) and from downpipe 13 (which is replugged via cap 13').

If the reading at gauge 21 is between 80 and 120 psi, then the second part of the test can be eliminated.

As seen in FIG. 2, the water flowing from standpipe 11 through the valves and meters passes into downpipe 13 where it flows down into well 14 (FIG. 1). In the preferred system of the invention, the water is thus recovered in well 14 and can be reused. Well 14 could be emptied to a predetermined level (the water being diverted elsewhere for reuse) prior to carrying out the tests so that no water is wasted. In prior art testing procedures where a hose is connected to each valve on each floor, the water is flowed out the building and wasted. Of course, if the building does not have a well, the testing procedures herein disclosed may be carried out with the water flowed down stream to a desired place of disposal.

Thus, the fire sprinkler valves at any given floor or location in a building can be tested at any time to exercise the internal parts of the preexisting pressure reducing valves to protect them from any build up of foreign matter. The tests disclosed herein can be carried out quickly and easily at less cost in materials and man hours than prior art testing systems and can be independent of the building or made a permanent fixture thereof. The system disclosed herein is safe and results in a considerable savings of water which is quite important in these times of conservation.

The residue water remaining in the line after testing is returned to the well for reclamation. Any suitable materials, such as stainless steel, may be used for the piping and couplings with bracing or support where necessary.

Although I have disclosed a desired arrangement of parts and method for using the same, obviously variations thereof may occur to an artisan and my invention is to be limited only by the appended claims.

I claim:

1. A method for testing the pressure and flow of water from a preexisting supply of water (11) associated with a building through a preexisting normally closed pressure reducing valve (15) having a normally capped discharge outlet (18), said building having a downpipe (13) for removing water from the building, said downpipe being normally plugged off by a removable cap(13'), said method comprising the steps of:

opening said outlet (18) and coupling to said outlet (18) a first conduit (22) and a water pressure measuring device (20) having a gauge (21) operatively coupled thereto;

coupling said device (20) to a water flow meter (23) having a manometer (25) operatively coupled thereto;

coupling said meter (23) via a second conduit (27) to a normally open shut-off valve (26) having a control handle (28);

removing said cap (13') from said downpipe (13) and coupling said shut-off valve (26, 28) via a third conduit (29) to said downpipe (13);

opening said reducing valve (15) thereby flowing fluid out of said outlet (18) and through said first conduit (22), through said water pressure measuring device (20), through said water flow meter (23), through said second conduit (27) to said shut-off valve (26) and into said downpipe (13) via said third conduit (29);

closing said shut-off valve (26) thereby stopping said water flow into said downpipe (13)

thereby creating a static pressure reading at said gauge (21) operatively coupled to said water pressure measuring device (20);

determining the static pressure reading on said gauge (21) and, if said reading is below a predetermined desired psi reading, adjusting said pressure reducing valve (15) until the static pressure, as measured at gauge (21), increased to at least said aforementioned predetermined desired psi reading;

opening said shut-off valve (26) via said handle (28) thereon thereby flowing water through said third conduit (29) and into said downpipe (13) while visually observing both the residual gallons per minute flowing from said first conduit (22) to said second conduit (27) as read at said manometer (25) and the residual pressure reading at said gauge (21) for a predetermined period of time and flow rate; and shutting off said reducing valve (15).

2. In the method of claim 1 including the steps of subsequently removing said first conduit (22), device (20), gauge (21), meter (23), manometer (25), second conduit (27), shut-off valve (26, 28) and third conduit (29) from said outlet (18) and removing said third conduit (29) from said downpipe (13) and recapping said normally capped outlet (18) and replacing said cap (13') on said downpipe (13).

3. In the method of claim 1 including the step of fluidly communicating said downpipe (13) with a well (14) in the basement of the building.

4. In the method of claim 1 wherein the step of visually observing comprises the step of visually observing for five minutes at a flow rate of 330 gallons per minute.

5. A method for testing the pressure and flow of water from a preexisting supply of water (11) associated with a building through a preexisting normally closed pressure reducing valve (15) having a normally capped discharge outlet (18), said building having a downpipe (13) for removing water from the building, said downpipe being normally plugged off by a removable cap (13'), said method comprising the steps of:

opening said outlet (18) and coupling to said outlet (18) a first conduit (22) and a water pressure measuring device (20) having a gauge (21) with a movable indicator needle operatively coupled thereto;

coupling said device (20) to a water flow meter (23) having a manometer (25) operatively coupled thereto;

coupling said meter (23) via a second conduit (27) to a normally open shut-off valve (26) having a control handle (28);

removing said cap (13') from said downpipe (13) and coupling said shut-off valve (26, 28) via a third conduit (29) to said downpipe (13);

opening said reducing valve (15) thereby flowing fluid out of said outlet (18) and through said first conduit (22), through said water pressure measuring device (20), through said water flow meter (23), through said second conduit (27) to said shut-off valve (26) and into said downpipe (13) via said third conduit (29);

closing said shut-off valve (26) thereby stopping said water flow into said downpipe (13) thereby creating a static pressure reading at said gauge (21) operatively coupled to said water pressure measuring device (20);

determining the static pressure reading on said gauge (21) and, if said needle of said gauge (21) moves on said gauge (21) to a position where it is at a predetermined desired psi reading, then opening said shut-off valve (26) via said handle (28) thereby flowing water through said third conduit (29) and into said downpipe (13) while visually observing both the residual gallons per minute flowing from said first conduit (22) to said second conduit (27) as rad at said manometer (25) and the residual pressure reading at said gauge (21) for a predetermined period of time and flow rate; and shutting off said reducing valve (15).

6. In the method of claim 5 including the steps of subsequently removing said first conduit (22), device (20), gauge (21), meter (23), manometer (25) second conduit (27), shut-off valve (26, 28) and said third conduit (29) from said outlet (18) and removing said third conduit (29) from said downpipe (13) and recapping said normally capped outlet (18) and replacing said cap (13') on said downpipe (13).

7. In the method of claim 5 including the step of fluidly communicating said downpipe (13) with a well (14) in the basement of the building.

8. In the method of claim 5 wherein the step of visually observing includes the step of visually observing for five minutes at a flow rate of 330 gallons per minute.

* * * * *